Feb. 10, 1953 A. S. KING, JR 2,627,907
GAS TURBINE FUEL FEED SYSTEM WITH VAPOR REMOVING MEANS
Filed Oct. 7, 1948
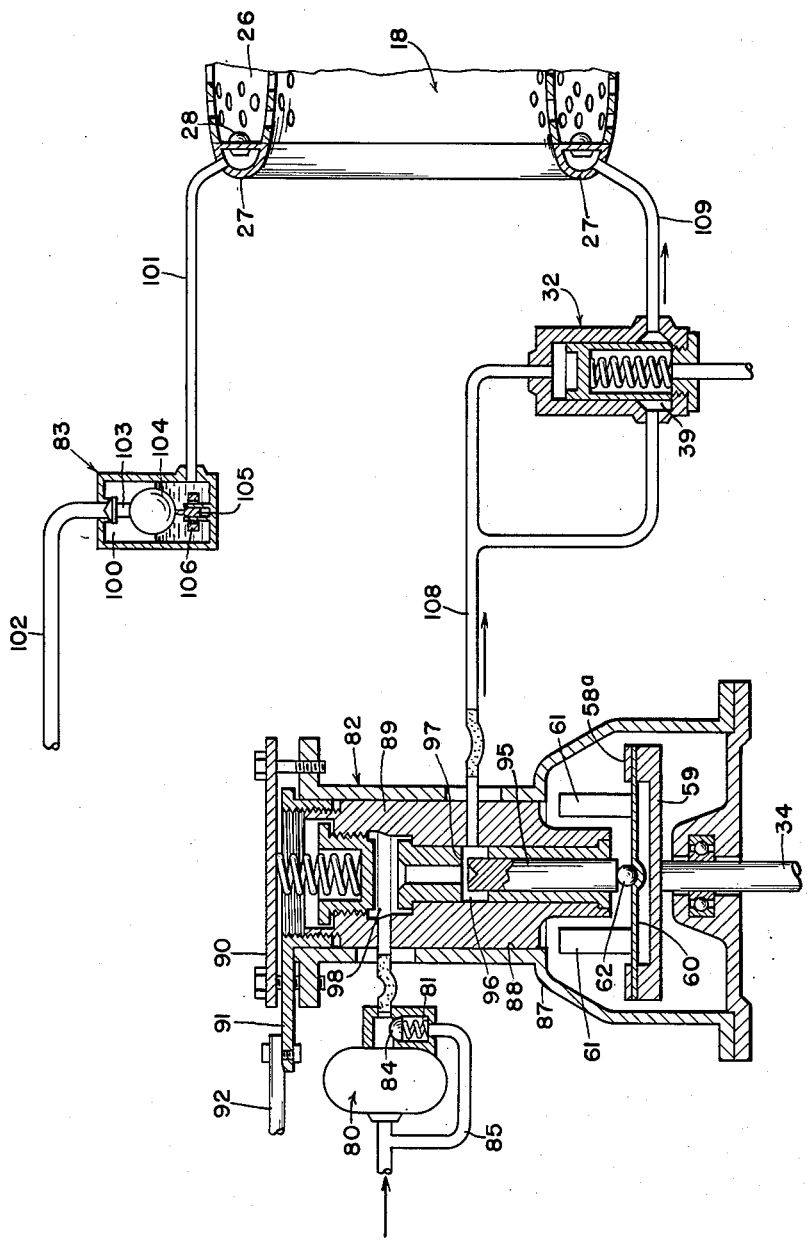
Inventor
ALEXANDER S. KING JR.
By Walter S. Pawl
Attorneys Patented Feb. 10, 1953

2,627,907

UNITED STATES PATENT OFFICE

2,627,907

GAS TURBINE FUEL FEED SYSTEM WITH VAPOR REMOVING MEANS

Alexander S. King, Jr., Virginia Beach, Va., assignor, by mesne assignments, to the United States of America as represented by the Secretary of the Navy Application October 7, 1948, Serial No. 53,209

2 Claims. (Cl. 158—36.3)

This invention relates to gas turbine power plants, and more particularly, to fuel supply apparatus for an aviation gas turbine engine.

In the operation of an aviation gas turbine engine, comprising a compressor and combustion apparatus operative to deliver heated motive fluid under pressure to a driving turbine from which motive fluid may be exhausted by way of a jet propulsion nozzle, it is desirable to control the flow of fuel to the combustion apparatus in accordance with requirements incident to varying flight speed and altitude. To this end a suitable governor is usually provided for maintaining a relatively constant R. P. M. or rotational speed of the engine for any selected throttle setting regardless of engine operating conditions, that is, flight speed and altitude of the aircraft. In operation, as the engine is initially accelerated from a low rotational speed, the governor is adapted to increase the fuel feed until a predetermined engine speed range is attained, whereupon the governor becomes operative to effect supply of fuel at a constant rate. Upon further increase in engine rotational speed, however, the governor finally becomes operative to reduce the flow of fuel, and may be designed to effect a further reduction in the flow to a still lower rate as the aircraft gains altitude.

During operation of a gas turbine engine at high altitude, when fuel demand is at a minimum, fuel flowing at a relatively low rate through the manifold may tend to vaporize, due to the effect of radiant heat from the adjacent combustion chamber, and might thus form a vapor lock in the upper portion of the manifold. Vapor lock in the manifold would be highly undesirable and might result in unfavorable temperature distribution contributing to early failure of the combustion apparatus.

It is an object of the present invention to provide means for preventing vapor lock in the manifold of a gas turbine power plant.

Another object of the invention is the provision of an improved fuel supply apparatus having means for minimizing stagnation of fuel in the manifold of such a power plant.

A further object of the invention is the provision of a fuel supply system including a manifold so related to the associated elements as to permit continuous circulation of fuel through the manifold for reducing any tendency toward stagnation and vaporization of fuel therein.

It is also an object of the invention to provide fuel supply apparatus for a gas turbine engine including means for venting vapor from the fuel manifold in order to prevent vapor lock.

The invention also has for an object the provision in a gas turbine power plant of a manifold having a fuel inlet and an outlet, the outlet communicating with means for receiving fuel overflowing the manifold to minimize any tendency toward development of vapor lock.

These and other objects are effected by my invention as will be apparent from the following description and claims taken in connection with the accompanying drawing, forming a part of this application, in which the figure is a fragmentary diagrammatic view, partly in section, of a part of a gas turbine engine equipped with a fuel supplying apparatus constructed in accordance with one form of the invention.

Referring to the drawing, the fuel combustion apparatus 18 is a component of a gas turbine engine (unshown). Combustion apparatus 18 includes an annular perforated basket structure or burner 26, at the forward end of which is mounted an annular fuel manifold 27 having a plurality of atomizing nozzles 28 through which liquid fuel is ejected under pressure into the stream of air supplied through the burner during operation of the engine.

There is a supply pump 80 having associated therewith a by-pass valve 81, a governor 82, the fuel pressure closed dump valve device 32 associated with the manifold 27, and a vapor discharge valve device 83. The pump 80 is shown in association with an elementary form of by-pass valve 81, which comprises a spring biased valve element 84 operative to limit the maximum pressure of fuel discharged by the pump, by returning excess fuel through a by-pass conduit 85 leading back to the usual reservoir.

According to this form of the invention, the governor 82 may have any conventional construction, and is diagrammatically illustrated as including a casing structure 87 having a bore 88 in which is slidably mounted an inner casing 89, which is adapted to be positioned through the medium of a screw threaded connection with an operating member 90 rotatably mounted in the upper portion of the casing 87. Suitable means (not shown) connected through an arm 91 and lever 92 may be provided for effecting rotation of the operating member 90 in accordance with the selected fuel feed rate. Slidably mounted in a suitable bore within the inner casing 89 is a cup valve member 95, which extends into a valve chamber 96 and is adapted for cooperation with a valve seat 97 carried by the inner casing, for controlling communication between the chamber 96 and a chamber 98 to which the pump 80 is adapted to deliver fuel under pressure. Movement of the cup valve element 95 toward and away from the seat 97 is controlled in accordance with engine speed through the medium of a centrifuge assembly 58a, which comprises a head 59 mounted on the upper end of an engine rotor or compressor operated shaft 34 and carrying a normally flat spring 60 which supports a pair of movable weights 61. The central portion of the spring 60 bears against a ball 62 engaging the lowermost end of the cup valve member 95. With the valve arrangement of the governor 82, the centrifuge 58a will respond to an increase in speed to reduce the orifice between the cup valve member 95 and the valve seat 97.

The vapor discharge valve device 83 comprises a casing having a chamber 100, which communicates by way of a conduit 101 with the uppermost end of the manifold 27, and through another conduit 102 with the usual reservoir. Operatively mounted within the chamber 100 is a valve element 103 and float 104 which are adapted to control communication between the chamber and conduit 102 in accordance with rise and fall of liquid fuel within the chamber. The float 104 has a stem 105 which extends downwardly in cooperative relation with a sliding weight 106 carried in the lower portion of the chamber 100. The weight 106 is adapted to remain inoperative so long as the fuel apparatus is carried in a normal position on the aircraft. In the event of inverted operation, however, the weight 106 will become effective to maintain the valve element 103 in its closed position for preventing escape of fuel therefrom by way of the conduit 102.

In operation, assuming that the governor 82 has been adjusted to provide the proper throttle setting, fuel under pressure delivered by operation of the pump 80 is supplied past the valve element 95 and through a conduit 108, the passageway 39 in the dump valve device 32, and a conduit 109 to the manifold 27, from which the fuel is injected into the burner 18 by way of the usual nozzles 28. A quantity of the fuel thus supplied under pressure to the manifold 27 will flow therefrom from the conduit 101 into the chamber 100 of the vapor discharge device 83, until the float 104 becomes operative to effect closure of the valve element 103. The pressure under which fuel is supplied to the manifold 27 is, in the embodiment of the invention shown in the figure, then controlled in accordance with the restricted aperture provided between the valve element 95 and valve seat 97 of the governor 82.

In the event of formation of vapor within the manifold 27, however, such vapor will rise to the upper portion of the manifold and be carried through the conduit 101 into the chamber 100 of the discharge valve device 83. Upon accumulation of sufficient quantity of vapor under pressure within the chamber 100, the float 104 will be lowered slightly, thereby unseating the valve element 103 and effecting quick discharge of vapor from the chamber through the conduit 102 to the reservoir. Upon discharge of vapor under pressure from the chamber 100, liquid fuel under pressure will again be forced into the chamber to raise the float 104 and valve element 103 to the normal seated position, as shown, thus preventing escape therefrom of liquid fuel. With the apparatus shown, it is thus impossible for any undesired vapor to remain in the manifold 27, while vapor accumulating in the upper portion of the vapor discharge device 83 will be effectively eliminated by intermittent operation of the device.

From the foregoing it will now be apparent that a fuel supply apparatus having features of construction embodying either form of the invention may readily be installed in association with an aviation gas turbine engine of the turbojet or turboprop type to render the fuel apparatus thereof substantially free from any tendency toward developing vapor lock, regardless of flight speed or altitude.

While the invention has been shown in one form, it will be obvious to those skilled in the art that it is not so limited, but is susceptible of various changes and modifications without departing from the spirit thereof.

What is claimed is:

1. Fuel supply apparatus for a gas turbine engine having combustion means, a fuel discharge manifold having nozzles adapted to be associated with said combustion means, said manifold having an inlet and an outlet, a source of liquid fuel, a pump operable to supply fuel under pressure from said source to said inlet of the manifold, a governor device operatively associated with said pump for regulating the flow of fuel therefrom to said manifold, and a control valve device having a chamber connected to said outlet of the manifold and disposed above the level of said manifold, a vent valve mounted in said chamber controlling a communication for effecting intermittent discharge of vapor, float means for closing said valve to prevent escape of liquid fuel from said manifold, and a weight mounted on said float means to maintain constant closure of the vent valve in the event of inverted operation.

2. Fuel supply apparatus for a gas turbine engine having combustion means, a fuel discharge manifold having nozzles adapted to be associated with said combustion means, said manifold having an inlet and an outlet, a source of liquid fuel, a pump operable to supply fuel under pressure from said source to said inlet of the manifold, a governor device operatively associated with said pump for regulating the flow of fuel therefrom to said manifold, and a control valve device having a chamber disposed above the level of said manifold, a conduit communicating said chamber with said outlet of the manifold, a discharge conduit opening into said chamber, a vent valve mounted in said chamber controlling communication between said chamber and said discharge conduit for effecting intermittent discharge of vapor from said chamber, float means for closing said vent valve to prevent escape of liquid fuel from said manifold and including a float provided with a stem, and a weight slidably mounted on said stem to maintain constant closure of said vent valve in the event of inverted operation.

ALEXANDER S. KING, Jr.

REFERENCES CITED

The following references are of record in the file of this patent:

UNITED STATES PATENTS

| Number | Name | Date |
| --- | --- | --- |
| 654,140 | Diesel | July 24, 1900 |
| 1,299,230 | Roos | Apr. 1, 1919 |
| 1,623,074 | Tartrais | Apr. 5, 1927 |
| 2,078,957 | Lysholm | May 4, 1937 |
| 2,081,188 | Walker et al. | May 25, 1937 |
| 2,348,008 | Hunt | May 2, 1944 |
| 2,412,289 | Pugh et al. | Dec. 10, 1946 |
| 2,414,158 | Mack | Jan. 14, 1947 |
| 2,446,523 | Bradbury et al. | Aug. 10, 1948 |
| 2,485,525 | Bedale | Oct. 18, 1949 |

FOREIGN PATENTS

| Number | Country | Date |
| --- | --- | --- |
| 918,129 | France | Oct. 7, 1946 |